US012659810B2

(12) United States Patent
Cai et al.

(10) Patent No.: US 12,659,810 B2
(45) Date of Patent: Jun. 16, 2026

(54) SERVICE-DYNAMIC USER EQUIPMENT (UE) HANDOVER

(71) Applicant: T-Mobile USA, Inc., Bellevue, WA (US)

(72) Inventors: Zheng Cai, Fairfax, VA (US); Zheng Fang, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 578 days.

(21) Appl. No.: 18/072,519

(22) Filed: Nov. 30, 2022

(65) Prior Publication Data

US 2024/0179600 A1     May 30, 2024

(51) Int. Cl.
*H04W 36/00*     (2009.01)
*H04W 36/30*     (2009.01)

(52) U.S. Cl.
CPC ........ *H04W 36/0011* (2013.01); *H04W 36/30* (2013.01)

(58) Field of Classification Search
CPC .......................... H04W 36/0011; H04W 36/30
See application file for complete search history.

(56) References Cited

U.S. PATENT DOCUMENTS

| 8,077,675 | B2 | 12/2011 | Stephenson et al. |
| 8,553,526 | B2 | 10/2013 | Meylan et al. |
| 8,559,298 | B2 | 10/2013 | Patil et al. |
| 8,589,541 | B2 | 11/2013 | Raleigh et al. |
| 8,600,384 | B1 | 12/2013 | Moreno et al. |
| 9,467,919 | B2 | 10/2016 | Yerrabommanahalli et al. |
| 9,681,395 | B2 | 6/2017 | Tabet et al. |
| 9,763,130 | B1 | 9/2017 | Singh et al. |
| 9,954,642 | B2 | 4/2018 | Wong et al. |
| 10,009,819 | B2 | 6/2018 | Khay-ibbat et al. |
| 10,021,616 | B2 | 7/2018 | Oroskar et al. |
| 10,171,967 | B2 | 1/2019 | Ameixieira |
| 10,172,177 | B2 | 1/2019 | Gheorghiu et al. |

(Continued)

FOREIGN PATENT DOCUMENTS

| CN | 101517994 A | 8/2009 |
| CN | 111512596 A | 8/2020 |

(Continued)

OTHER PUBLICATIONS

"3GPP TS 38.331", version 17.0.0 Release 17, section 5.3.5.

*Primary Examiner* — Khaled M Kassim
*Assistant Examiner* — Christopher A. Reyes
(74) *Attorney, Agent, or Firm* — Perkins Coie LLP

(57)     ABSTRACT

Aspects of the disclosure relate to improve user equipment (UE) handover and mobility within a telecommunication network. Events that trigger a handover operation are defined by multiple thresholds corresponding to (and reflecting the requirements of) network-supported services. In one example, a base station detects an execution of a network-supported service at a UE and responsively transmits a threshold corresponding to the network-supported service to the UE. The UE monitors reference signals according to the threshold and transmits measurement reports if the thresholds are exceeded or satisfied. In some examples, at any given time, the UE monitors one or more thresholds corresponding to which (if any) network-supported services are presently being executed by the UE.

17 Claims, 5 Drawing Sheets

(56)                References Cited

U.S. PATENT DOCUMENTS

| | | | |
|---|---|---|---|
| 10,292,076 B2 | 5/2019 | Alriksson et al. | |
| 10,321,376 B2 | 6/2019 | Lakhdhar et al. | |
| 10,602,417 B2 | 3/2020 | Vemuri et al. | |
| 10,772,016 B2 | 9/2020 | Chen et al. | |
| 11,147,001 B2* | 10/2021 | Choi | H04W 36/00 |
| 11,490,313 B2 | 11/2022 | Isaksson et al. | |
| 2006/0142021 A1* | 6/2006 | Mueckenheim | H04W 36/22 455/450 |
| 2007/0258433 A1* | 11/2007 | Speight | H04L 47/2425 370/349 |
| 2009/0116447 A1* | 5/2009 | Balasubramanian | H04W 36/302 370/331 |
| 2009/0310565 A1* | 12/2009 | Huo | H04W 24/02 370/331 |
| 2010/0278150 A1* | 11/2010 | Park | H04W 36/302 370/332 |
| 2011/0039562 A1* | 2/2011 | Balasubramanian | H04W 36/0033 455/436 |
| 2014/0045505 A1* | 2/2014 | Henry | H04W 36/04 455/444 |
| 2015/0373507 A1* | 12/2015 | Jung | H04W 24/08 370/235 |
| 2016/0029279 A1* | 1/2016 | Bellamkonda | H04W 36/0079 455/436 |
| 2016/0241597 A1* | 8/2016 | Falk | G06F 21/62 |
| 2017/0230869 A1* | 8/2017 | Kubota | H04B 7/0639 |
| 2018/0035432 A1* | 2/2018 | Jeon | H04W 72/52 |
| 2018/0098249 A1* | 4/2018 | Lee | H04W 76/23 |
| 2018/0146390 A1* | 5/2018 | Kim | H04W 36/0011 |
| 2018/0220317 A1* | 8/2018 | Yilmaz | H04W 24/08 |
| 2018/0270677 A1* | 9/2018 | Brisebois | H04W 28/0236 |

| | | | |
|---|---|---|---|
| 2019/0104442 A1* | 4/2019 | Witzel | H04W 36/08 |
| 2019/0199413 A1* | 6/2019 | Sundararajan | H04B 7/0617 |
| 2019/0259270 A1* | 8/2019 | Amini | H04N 19/103 |
| 2019/0268930 A1* | 8/2019 | Rudolf | H04L 5/0094 |
| 2019/0289534 A1* | 9/2019 | Ryoo | H04W 48/18 |
| 2020/0107236 A1* | 4/2020 | Tseng | H04W 72/044 |
| 2020/0364187 A1* | 11/2020 | Tran | G06N 3/02 |
| 2020/0383022 A1* | 12/2020 | Shrestha | H04W 36/362 |
| 2021/0022055 A1* | 1/2021 | Tseng | H04W 36/362 |
| 2021/0099921 A1* | 4/2021 | Han | H04W 68/02 |
| 2021/0100037 A1* | 4/2021 | Karlsson | H04W 74/0833 |
| 2021/0105681 A1* | 4/2021 | Paladugu | H04W 36/00837 |
| 2021/0306925 A1* | 9/2021 | Khan | H04W 52/362 |
| 2022/0046508 A1* | 2/2022 | Xu | H04W 36/0011 |
| 2022/0095176 A1* | 3/2022 | Lim | H04W 36/0058 |
| 2022/0191682 A1* | 6/2022 | Li | H04W 8/205 |
| 2022/0210823 A1* | 6/2022 | Alfarhan | H04L 1/1822 |
| 2022/0295442 A1* | 9/2022 | Goyal | H04W 64/00 |
| 2022/0312318 A1* | 9/2022 | Babaei | H04W 52/0229 |
| 2023/0354431 A1* | 11/2023 | Tripathi | H04W 74/002 |
| 2024/0073719 A1* | 2/2024 | Ghosh | H04W 76/19 |
| 2024/0179600 A1* | 5/2024 | Cai | H04W 36/0011 |

FOREIGN PATENT DOCUMENTS

| | | |
|---|---|---|
| CN | 114697994 A | 7/2022 |
| EP | 2112849 A2 | 10/2009 |
| EP | 2577332 B1 | 9/2016 |
| EP | 3183911 A1 | 6/2017 |
| KR | 100976288 B1 | 8/2010 |
| WO | 2016093753 A1 | 6/2016 |
| WO | 2019140646 A1 | 7/2019 |
| WO | 2020122796 A1 | 6/2020 |
| WO | 2022002396 A1 | 1/2022 |
| WO | 2022005356 A1 | 1/2022 |

* cited by examiner

```
reportConfigToAddModList {
  {
    reportConfigId 1,
    reportConfig reportConfigNR: {
      reportType eventTriggered: {
        eventId eventA2: {
          a2-Threshold rsrp: 16,
          reportOnLeave FALSE,
          hysteresis 0,
          timeToTrigger ms0
        },
        rsType ssb,
        reportInterval ms120,
        reportAmount r1,
        reportQuantityCell {
          rsrp TRUE,
          rsrq TRUE,
          sinr TRUE
        },
        maxReportCells 1,
        includeBeamMeasurements FALSE
      }
```

SERVICE-DYNAMIC USER EQUIPMENT (UE) HANDOVER

BACKGROUND

In cellular telecommunications, handover relates to the process of transferring an ongoing call or data session from one channel connected to the core network to another channel. Handover allows for mobility of user equipment (UE) connected to the network.

BRIEF DESCRIPTION OF THE DRAWINGS

Detailed descriptions of implementations of the present invention will be described and explained through the use of the accompanying drawings.

FIG. 4 illustrates an example portion of a message transmitted to a UE to provide handover-related thresholds.

Figure 1:
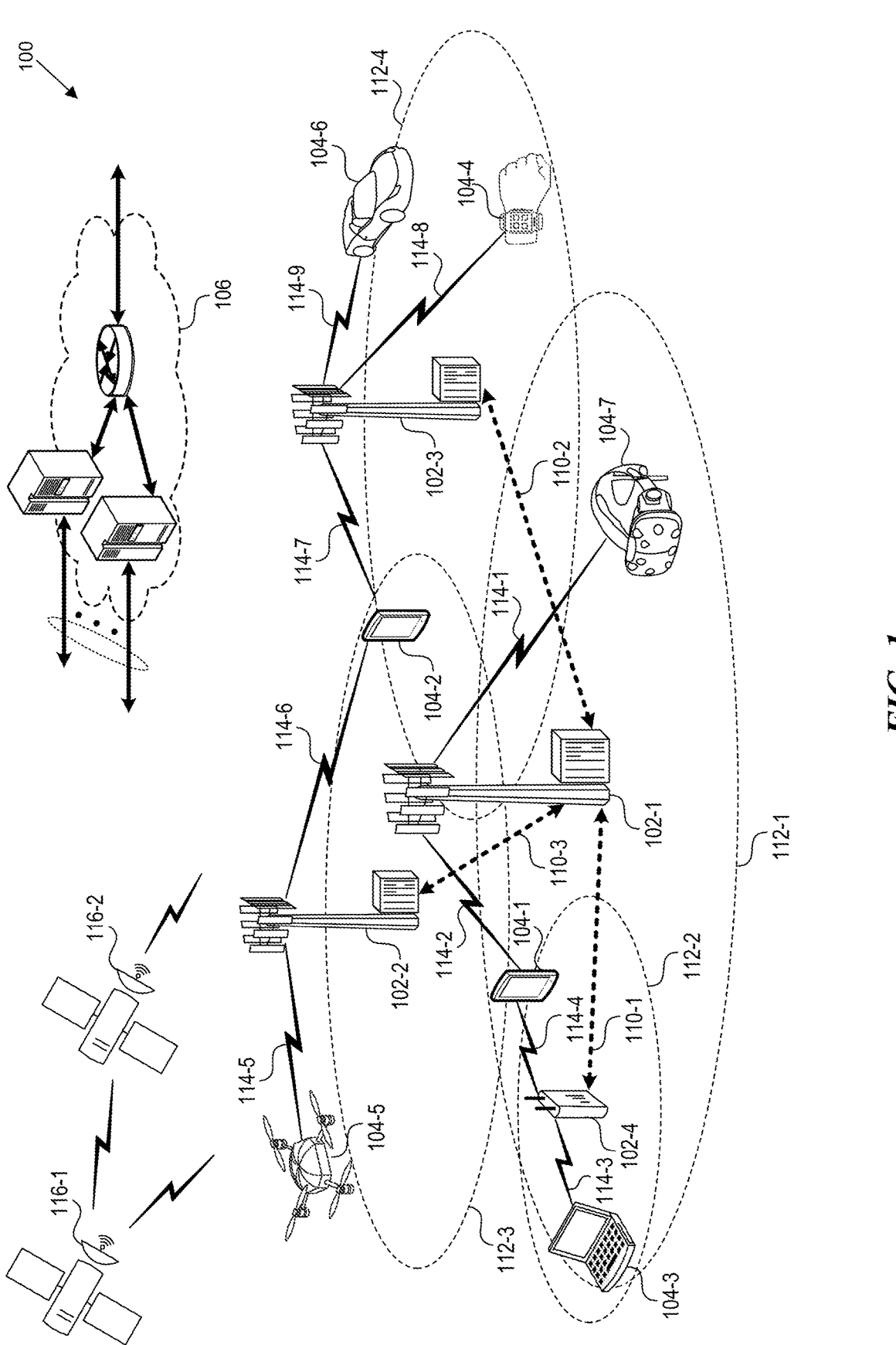
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to improving specificity and dynamicity of user equipment (UE) handovers within a telecommunication network. Handovers are triggered based on certain events being monitored for and detected by UEs using thresholds with respect to signal measurements. According to aspects of the disclosed technology, a UE is dynamically provided with thresholds that are specific to the services or applications being executed by the UE, and the UE uses these thresholds to monitor for and detect handover-related events (e.g., events that trigger a handover, events that cancel a handover). In particular, different network-supported services are associated with different thresholds configured for respective communications requirements, and the UE uses thresholds that correspond to the services being presently executed at the UE. As such, different UEs partake in different handover behavior that is customized to the needs and requirements of the respective services or applications at each UE, according to the disclosed technology.

Thus, the disclosed technology addresses various technical challenges. In current telecommunication networks, the use of static or fixed thresholds for handover-related events results in certain services not meeting respective high-scale requirements. For example, while fixed thresholds can trigger handovers as intended to support low-requirement services like mobile internet, the handovers would not be triggered as needed to support high-requirement services like extended reality (XR) services. Similarly, in other examples, fixed thresholds that are stringent enough to support high-requirement services cause excessive handovers for UEs that are only executing low-requirement services and UEs that are not even compatible with or capable of executing the high-requirement services. Unnecessary ping-ponging of UEs and unneeded performance of network operations then occurs.

The disclosed technology provides a dynamic UE-specific solution. In some implementations, event thresholds specific to different network-supported services are stored and managed by the telecommunication network, and the event thresholds reflect the respective requirements of the corresponding services. The telecommunication network detects services that are presently being executed at a given UE and responsively provides the corresponding thresholds to the given UE to use in event monitoring. In some implementations, the telecommunication network transmits the corresponding thresholds in a radio resource control (RRC) reconfiguration message to the given UE. In some implementations, multiple services are presently being executed at the given UE, and the telecommunication network selects a specific threshold (e.g., the most stringent threshold) to provide to the given UE. Upon certain services terminating, the telecommunication network provides messages to the UE that indicate updates to the thresholds to use.

Therefore, the present state of the UE with respect to service or application execution is detected and used to provide state-specific thresholds. Low-tier or mid-tier devices use thresholds customized to their services, while high-tier devices use other thresholds corresponding to high-requirement services (if being presently executed at the high-tier devices). The disclosed technology reduces the number of handovers performed by the network, improves network performance, and results in better user experiences at the UEs.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 in which aspects of the disclosed technology are incorporated. According to example aspects of the disclosed technology, handover of UEs connected to the wireless telecommunication network 100 is improved based on dynamically providing thresholds to a UE that correspond to network-supported services being presently executed by the UE. As such, UE mobility is customized for each UE based on the services executed by each UE. In some implementations, the wireless telecommunication network 100 stores and manages pre-defined thresholds that correspond to network-supported services and transmits messages with certain thresholds to a UE based on detecting execution of corresponding services at the UE.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104" and also referred to herein as user equipment or UE) and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

Wireless devices 104 of the wireless telecommunication network 100 vary in type and capability. For example, the wireless devices 104 illustrated in FIG. 1 includes a head-mounted device (HMD) that is configured to execute XR services (104-7), a smart watch device (104-4), a mobile phone (104-1), and others. The wireless devices 104 each execute different services or applications and according to aspects of the disclosed technology, handover of the wireless devices 104 within the wireless telecommunication network 100 is specific to each wireless device 104 and the services or applications presently being executed at each wireless device 104.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The wireless telecommunication network 100 is configured for handover of wireless devices 104 connected to the wireless telecommunication network 100. In some examples, handover operations for a wireless device 104 involves more than one base station 102. In some implementations, the handover operations are triggered by measurement reports by the wireless device 104 that report certain events that are each pre-defined by one or more thresholds. For example, the wireless telecommunication network is a 5G New Radio (NR) network, and handovers are triggered by the example pre-defined events listed in Table 1 below. It will be appreciated that these and other events currently defined, previously defined, and yet to be defined can also be used in various implementations of the disclosed technology. Each of the events are defined by one or more thresholds, and the thresholds are defined with respect to one or more measurement items or parameters, such as reference signal received power (RSRP), reference signal received quality (RSRQ), signal-to-interference-plus-noise ratio (SINR), and the like. In some implementations, the wireless devices 104 monitor for one or more events specified by a message received from the wireless telecommunication network 100 based on receiving and measuring reference signals from the wireless telecommunication network 100.

TABLE 1

| 5G Measurement Events | Description |
|---|---|
| Event A1 | Serving cell becomes better than threshold |
| Event A2 | Serving cell becomes worse than threshold |
| Event A3 | Neighbor cell becomes offset better than special cell |
| Event A4 | Neighbor cell becomes better than threshold |
| Event A5 | Special cell becomes worse than threshold1 and neighbor cell becomes better than threshold2 |
| Event A6 | Neighbor cell becomes offset better than secondary cell |
| Event B1 | Inter-RAT neighbor becomes better than threshold |
| Event B2 | Primary serving cell becomes worse than threshold1 and inter-RAT neighbor becomes better than threshold2 |
| Event I1 | Interference becomes higher than threshold |
| Event C1 | NR sidelink channel busy ratio is above threshold |
| Event C2 | NR sidelink channel busy ratio is below threshold |

The communication networks that accommodate various disclosed examples can be packet-based networks that operate according to a layered protocol stack. In the user plane, communications at the bearer or Packet Data Convergence Protocol (PDCP) layer can include IP-based payloads. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links. In handover operations, communication links 114 can be created, redirected or modified, and/or terminated in order to provide UE mobility within the wireless telecommunication network 100.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Example 5G Core Network Functions

Figure 2:
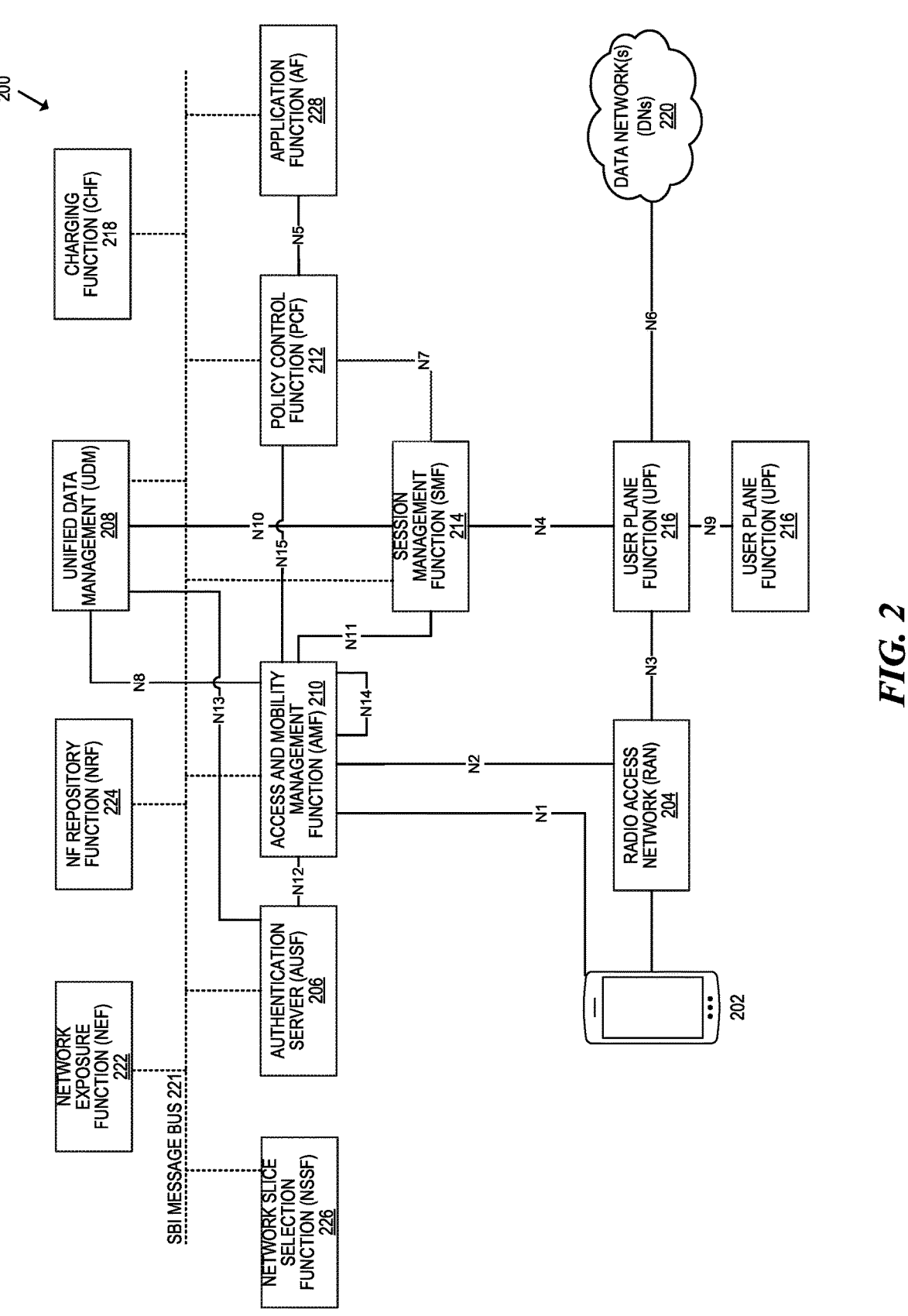
FIG. 2 is a block diagram that illustrates 5G core network functions (NFs) that can implement aspects of the present technology.

FIG. 2 is a block diagram that illustrates an architecture 200 including 5G core network functions (NFs) that are related to aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. In some implementations, one or more NFs of the core network perform example operations described herein to detect network-supported services being executed by a UE, provide event thresholds that correspond to network-supported services to UEs, and facilitate handover of UEs between network cells and/or nodes.

The interfaces N1 through N15 define communications and/or protocols between each NF as described in relevant standards. The UPFs 216 are part of the user plane and the AMF 210, SMF 214, PCF 212, AUSF 206, and UDM 208 are part of the control plane. One or more UPFs can connect with one or more data networks (DNs) 220, and multiple UPFs can communicate with one another (e.g., via N9 interfaces). The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP) (not explicitly illustrated in FIG. 2).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Operations for Service-Dynamic Handover

Figure 3:
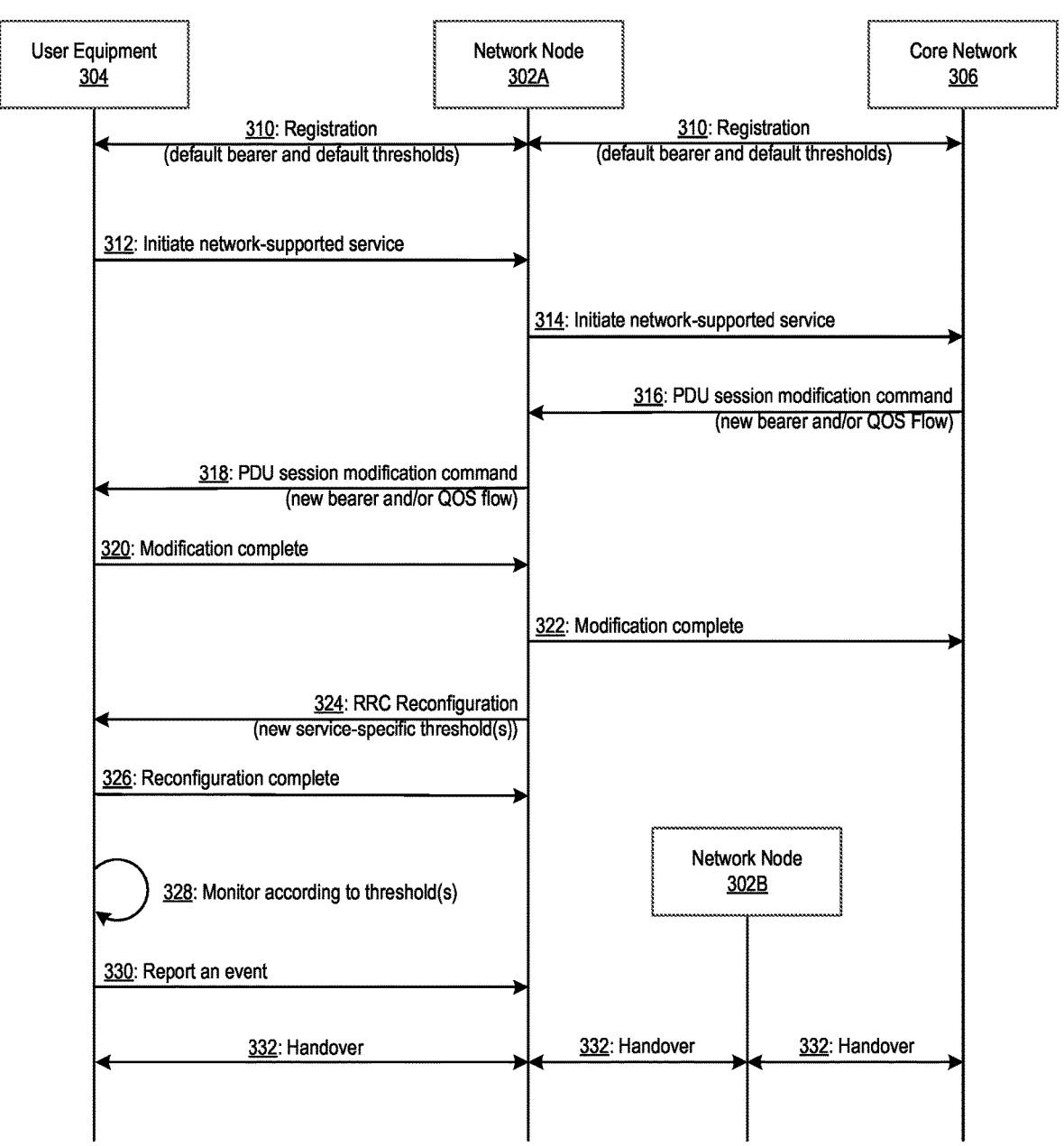
FIG. 3 is a sequence diagram that illustrates example operations related to dynamically providing handover-related thresholds to a UE that correspond to presently-executed services at the UE.

FIG. 3 is a sequence diagram that illustrates example operations for UE mobility within a network on a UE-specific basis. According to the illustrated implementation, UE mobility is improved based on dynamically providing thresholds corresponding to services presently being executed at a UE. As shown, example operations are performed by one or more of a UE 304, one or more network nodes 302 of the network, or a core network 306 of the network. In an example implementation, the UE 304 corresponds to a wireless device 104 in FIG. 1, a network node 302 corresponds to a base station 102 in FIG. 1, and the core network 306 corresponds to the core network 106 in FIG. 1. In some implementations, the core network 306 includes one or more network functions as shown in FIG. 2.

At 310, the UE 304 registers with the core network 306 via the network node 302A. In some embodiments, the registration process includes the UE 304 transmit a radio resource control (RRC) setup message or request to the network node 302A, and a RRC connection between the UE 304 and the network node 302A is setup. In some embodiments, the registration process further includes NAS level authentication and an AS security procedure.

During registration, a default PDU session is established, and a default data radio bearer is set up between the UE 304 and the network node 302A via RRC reconfiguration messages from the network node 302A. In some embodiments, the RRC reconfiguration messages during registration include information related to handover-related events to be monitored by the UE 304. In some embodiments, the RRC reconfiguration messages during registration indicate one or more events of a set of pre-defined events to monitor. For example, during registration, the UE 304 receives an indication of a subset of the 5G pre-defined events (as shown in Table 1). In some embodiments, the RRC reconfiguration messages during registration include default thresholds for each indicated event, and the default thresholds define each event with respect to at least one signal parameter.

FIG. 4 illustrates an example portion of a message transmitted by the network node 302 to the UE 304 during registration. For example, the illustrated portion is an information element (IE) of a RRC reconfiguration message. As illustrated, the message portion includes an indication of Event A2 and a threshold of 16. In particular, the threshold of 16 defines an occurrence of Event A2 with respect to the signal parameter of RSRP, in the illustrated example. In some embodiments, the message includes a plurality of portions that each indicate an event and respective thresholds defining occurrences thereof. During registration, the threshold(s) indicated in the RRC reconfiguration message are default thresholds or service-agnostic thresholds, or thresholds that are not specific to or reflecting requirements of any particular network-supported service.

Returning to FIG. 3, at 312, the UE 304 initiates an execution of a network-supported service, and in some embodiments, the UE 304 transmits a message or request relating to the network-supported service to the network node 302A. Network-supported services refer to applications, services, programs, processes, and/or the like executed by the UE 304 and involving a communication channel via the network. For example, network-supported services include voice-over-new-radio (VoNR) services, voice-over-LTE (VoLTE) services, mobile Internet services, extended reality services (e.g., mixed reality, augmented reality, virtual reality), video streaming services, cloud computing services, and/or the like. Accordingly, the UE 304 indicates the initiation of a network-supported service to the network node 302A. At 314, the network node 302A indicates the network-supported service to the core network 306. For example, the UE 304 transmits a VoNR call request (a session initiation protocol (SIP) invite) to the network nodes 302A, which indicates the VoNR call request to the core network for establishing a call connection. In doing so, the core network 306 begins establishing a connection with other devices, systems, and/or networks involved in the network-supported service.

At 316, the core network 306 transmits a PDU session modification command to the network node 302A. The PDU session modification command instructs the network node 302A to establish a new data radio bearer (DRB) and/or a new quality-of-service (QOS) flow with the user equipment 304 to support the network-supported service specifically. In particular, network-supported services include services that are supported by corresponding DRBs and/or QoS flows other than the default DRB and/or default flow. Accordingly, at 318, the network node 302A communicates with and signals the UE 304 to establish the new DRB and/or QoS flow. At 320 and 322, acknowledgement or confirmation of the new DRB and/or QoS flow is communicated to the network node 302A and the core network 306.

At 324, the network node 302A transmits a RRC reconfiguration message to the UE 304 in response to the new DRB and/or QoS flow being established. Specifically, the new DRB and/or QoS flow is indicative of the network-supported service being initiated and executed at the UE 304, and therefore, the network node 302A detects the execution of the network-supported service at the UE 304 according to a presence of the new DRB and/or QoS flow.

According to aspects of the disclosed technology, the network node 302A transmits the RRC reconfiguration message to re-define event thresholds to be specific to and reflect the requirements of the network-supported service. In particular, the RRC reconfiguration message at 324 includes new thresholds corresponding to the network-supported service and for one or more events (e.g., the same events indicated during registration, a new set of events for the UE 304 to monitor) to replace the thresholds being used by the UE 304 (e.g., the default or service-agnostic thresholds received by the UE 304 during registration). That is, in some embodiments, the RRC reconfiguration message causes the UE 304 to stop monitoring signal parameters according to previously-received thresholds.

In some embodiments, new thresholds re-define the occurrence of handover events that were defined by previous thresholds provided to the UE 304. In some embodiments, multiple thresholds are provided to the UE 304 over time, and the UE 304 uses the most recently provided thresholds. For example, recently provided thresholds (e.g., thresholds provided at 324 compared to thresholds provided at 310) supersede the previously provided thresholds, are associated with a higher priority compared to previously provided thresholds, and/or the like. In some embodiments, the UE 304 deletes previously provided thresholds when receiving new thresholds, such that the UE 304 only manages the most current set of thresholds. In some embodiments, the UE 304 adjusts the previously provided thresholds or prior thresholds based on the newly received thresholds. Therefore, in some embodiments, re-defining an occurrence of a handover event includes the UE 304 receiving new thresholds for the handover event that replace, supersede, update, and/or the like, prior thresholds for the handover event.

In some embodiments, the network node 302A generates the RRC reconfiguration to include IEs (e.g., the message portion as shown in FIG. 4) that include service-specific thresholds. To do so, in some embodiments, the network node 302A stores a plurality of service-specific thresholds each defining the occurrence of a given handover event with respect to at least one signal parameter and each corresponding to a network-supported service. Accordingly, at 324, the network node 302A identifies one or more service-specific thresholds to include in the RRC reconfiguration transmitted to the UE 304. After receiving the RRC reconfiguration message with new service-specific thresholds that correspond to the network-supported service, the UE 304 signals completion of the reconfiguration to the network node 302A, at 326.

At 328, the UE 304 monitors signal parameters according to the network. The UE 304 measures the signal parameters from reference signals received from one or more network nodes 302 (e.g., including network node 302A and network node 302B. In some embodiments, the UE 304 measures and monitors the signal parameters on a periodic basis (e.g., at a frequency at which the UE 304 receives reference signals) or response to a command, condition, or trigger. In some embodiments, the UE 304 is provided with service-specific thresholds for more than one event, and the UE 304 evaluates the signal parameters with respect to the thresholds for each event.

The example operations described in the context of 312-328 are repeated for each new network-supported service initiated and executed by the UE 304, in some embodiments.

For example, the network node 302A detects a second network-supported service is being executed concurrently with the network-supported service according to a presence of a new DRB and/or QoS flow new radio bearer. Responsively, the network node 302A transmits a second RRC reconfiguration message that includes indications of new thresholds that re-define monitored events or that define new events to monitor. In some embodiments, for two network-supported services being concurrently executed, the network node 302A selects particular thresholds from the two sets of service-specific thresholds corresponding to the two network-supported services. In some examples, the particular threshold selected between two service-specific thresholds is the more stringent or strictest of the two (e.g., lower with respect to trigger conditions, higher with respect to cancelation conditions).

In some embodiments, the network node 302A, subsequent to selecting the particular thresholds to indicate to the UE 304 for the concurrent execution of the two network-supported services, associates the particular thresholds with the combination of the two network-supported services. In doing so, the network node 302A more efficiently prepares and transmits RRC reconfiguration messages the next time the concurrent execution of the two network-supported services is encountered. In some embodiments, the network node 302A waits for a pre-determined length of time after the network node 302A detects the presence of a new DRB and/or QoS flow. In doing so, the network node 302A is able to observe whether the UE 304 also initiates another network-supported service and to delay the RRC reconfiguration until after the initiation of the following network-supported service. As such, the network node 302A avoids repeated transmissions of RRC reconfiguration messages in a short timeframe.

The example operations described above in the context of 312-328 are similarly repeated for each disconnection or termination of a network-supported service at the UE 304, in some embodiments. For example, the network node detects that a network-supported service has terminated and is no longer being executed at the UE 304 based on the corresponding DRB and/or QoS flow being disconnected. The network node responsively sends an RRC reconfiguration message following the disconnection of the radio bearer to indicate a service-agnostic threshold again, to indicate a service-specific threshold corresponding to the remaining network-supported service being executed, or to indicate a particular threshold for a combination of remaining network-supported services being executed. Thus, indications of thresholds for monitoring are dynamically transmitted as network-supported services are initiated and disconnected, so that the present state of services being executed at the UE 304 is responsively captured and used in improving specificity of UE mobility and handovers.

At 330, the UE 304 detects an occurrence of an event based on the measurement and monitored signal parameters satisfying one or more thresholds currently in place (or reflecting the requirements of the present services at the UE 304). The UE 304 accordingly transmits a measurement report to the network node that indicate the specific event that was detected. At 332, handover for the UE 304 is performed, and in some implementations, the handover involves the core network and one or more other network nodes 302B. In facilitating the handover, each of the UE 304, the network nodes 302A and 302B, and the core network 306 (e.g., the AMF, one or more UPFs) perform various operations according to established handover techniques for the network. In some example circumstances, 330 and 332 may not occur if no events being monitored occur with respect to the dynamically-provided thresholds.

It will be understood that some aspects of the disclosed technology is described in the context of 5G NR networks in order to convey, illustrate, and demonstrate example concepts related to the disclosed technology. However, those aspects of the disclosed technology should not be construed as being limited to 5G NR networks and are conceivably implemented with other networks. For example, indications of new thresholds can be transmitted to UEs in other messages besides RRC reconfiguration messages, such as messages defined for other telecommunication networks (e.g., 3G, 4G, 6G). As another example, thresholds can be defined with respect to other signal parameters that are relevant to other types of networks, such as latency, ping, jitter, and/or the like.

Example Computer Systems

Figure 5:
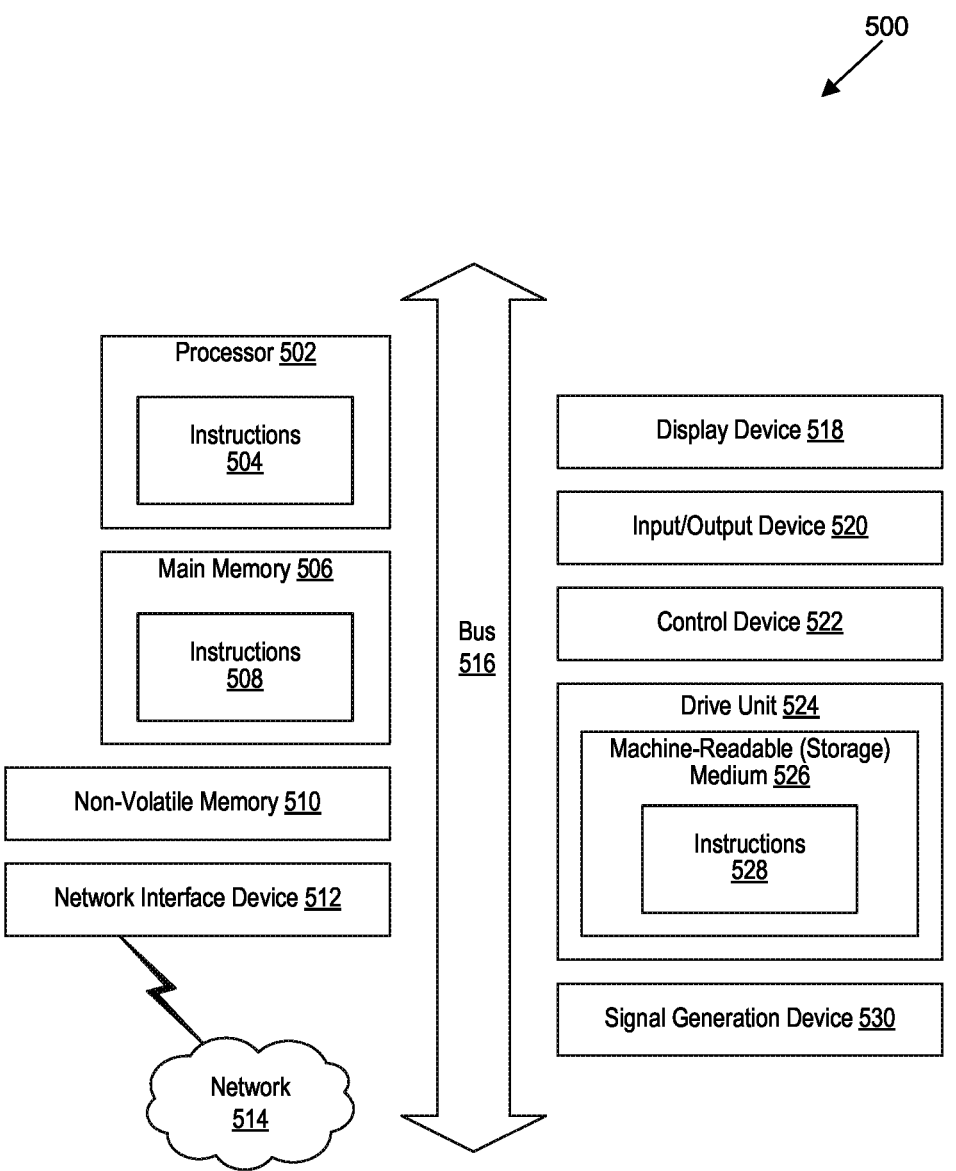
FIG. 5 is a block diagram that illustrates an example of a computer system in which at least some operations described herein can be implemented.

FIG. 5 is a block diagram that illustrates an example of a computing system 500 in which at least some operations described herein can be implemented. In some examples, the computing system 500 implements a network node or base station that detects services presently being executed at a UE, provides various thresholds to the UE, and facilitates handovers of UEs responsive to receiving measurement reports from UEs. In some examples, the computing system 500 implements a UE or wireless device that receives thresholds for monitoring, generates and transmits measurement reports to a base station, and participates in handover operations. In some examples, the computing system 500 implements a core network function that facilitates example operations described herein.

As shown, the computing system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computing system 500 can be an embedded computer system, a system-on-chip (SOC), a single-board computer system (SBC) or a distributed system such as a mesh of computer systems or include one or more cloud components in one or more networks. Where appropriate, one or more computing systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the disclosed technology. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the present disclosure, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed herein, unless the above Detailed Description explicitly defines such terms. Accordingly, the actual scope of the present disclosure encompasses not only the disclosed examples, but also all equivalent ways of practicing or implementing the disclosed technology under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the disclosed technology can be modified to employ the systems, functions, and concepts of the various references described above to provide yet further implementations of the disclosed technology.

To reduce the number of claims, certain implementations are presented below in certain claim forms, but the applicant contemplates various aspects of the disclosed technology in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A wireless communication node comprising at least one data processor and a memory storing instructions that, when executed by the at least one data processor, cause the wireless communication node to:

during a registration process for a wireless communication device with a communications network, transmit an indication of a service-agnostic threshold that is unrelated to network-supported services to the wireless communication device, wherein the service-agnostic threshold defines an occurrence of a handover event with respect to at least one communications signal parameter;

detect that a first application is being executed at the wireless communication device based on a first presence of an application-specific communication link between the communications network and the wireless communication device, in response to detecting that the first application is being executed, transmit, to the wireless communication device, an indication of an application-specific threshold that re-defines the occurrence of the handover event with respect to the at least one communications signal parameter by superseding the service-agnostic threshold, wherein the application-specific threshold is one of a plurality of pre-determined thresholds each associated with a respective application, receive, from the wireless communication device, an indication of the occurrence of the handover event based on the at least one communications signal parameter satisfying the application-specific threshold while the first application is being executed;

perform at least one operation for a handover of the wireless communication device between cells of the communications network according to the handover event;

detect that a second application is being executed at the wireless communication device based on a second presence of a second application-specific communication link between the communications network and the wireless communication device;

in response to detecting that the second application is being executed, transmit, to the wireless communication device, an indication of a second application-specific threshold that re-defines the occurrence of the handover event with respect to the at least one communications signal parameter by superseding the application-specific threshold, wherein the second application-specific threshold is another of the plurality of pre-determined thresholds each associated with a respective application;

receive, from the wireless communication device, a second indication of the occurrence of the handover event based on the at least one communications signal parameter satisfying the second application-specific threshold while the second application is being executed; and perform at least one operation for a handover of the wireless communication device between cells of the communications network according to the handover event.

2. The wireless communication node of claim 1, wherein the instructions cause the wireless communication node to:

detect that the first application is no longer being executed at the wireless communication device based on the application-specific communication link being disconnected; and transmit, to the wireless communication device, an instruction to monitor the at least one communications signal parameter according to the service-agnostic threshold.

3. The wireless communication node of claim 1, wherein the indication of the application-specific threshold includes an instruction to monitor the at least one communications signal parameter according to the application-specific threshold instead of the service-agnostic threshold.

4. The wireless communication node of claim 1, wherein the indication of the application-specific threshold is included in a radio resource control (RRC) reconfiguration message transmitted to the wireless communication device.

5. The wireless communication node of claim 1, wherein the instructions further cause the wireless communication node to:

during the registration process, transmit an indication of a set of handover events for the wireless communication device to monitor, wherein the set of handover events includes the handover event, and wherein the indication of the service-agnostic threshold is included in the indication of the set of handover events.

6. A wireless communication device comprising at least one data processor and a memory storing instructions that, when executed by the at least one data processor, cause the wireless communication device to:

monitor at least one signal parameter according to a service-agnostic threshold that is unrelated to an application of the wireless communication device and that defines an occurrence of a handover event;

initiate an execution of the application;

in response to the execution of the application being initiated, receive an indication of an application-specific threshold from a wireless communication node of a network supporting the application, wherein the application-specific threshold redefines the occurrence of the handover event with respect to the at least one signal parameter by superseding the service-agnostic threshold;

monitor the at least one signal parameter according to the application-specific threshold during the execution of the application;

in response to the at least one signal parameter satisfying the application-specific threshold during the execution of the application, generate and transmit a report to the wireless communication node, wherein the report indicates the occurrence of the handover event;

initiate an execution of a second application of the wireless communication device;

in response to the execution of the second application being initiated, receive an indication of a second application-specific threshold from the wireless communication node, wherein the second application-specific threshold redefines the occurrence of the handover event with respect to the at least one signal parameter, wherein the second application-specific threshold is associated with one of the application or the second application; and monitor the at least one signal parameter according to the second application-specific threshold during the execution of the second application.

7. The wireless communication device of claim 6, wherein initiating the execution of the application includes causing an application-specific communication link with the wireless communication node to be established.

8. The wireless communication device of claim 6, wherein the instructions cause the wireless communication device to:

receive an indication of the service-agnostic threshold from the wireless communication node during a registration process of the wireless communication device with the network.

9. The wireless communication device of claim 6, wherein monitoring the at least one signal parameter according to the application-specific threshold includes stopping the monitoring of the at least one signal parameter according to the service-agnostic threshold.

10. The wireless communication device of claim 6, wherein the instructions cause the wireless communication device to:

in response to a disconnection of an application-specific communication link associated with the execution of the application, stop the monitoring of the at least one signal parameter according to the application-specific threshold.

11. The wireless communication device of claim 6, wherein the handover event is one of Event A1, Event A2, Event A3, Event A4, Event A5, Event A6, Event B1, Event B2, Event I1, Event C1, or Event C2 for a 5G NR network.

12. At least one non-transitory computer-readable storage medium storing instructions that, when executed by at least one data processor, cause the at least one data processor to:

transmit an indication of a service-agnostic threshold that is unrelated to one or more applications of a wireless communication device during a registration process of the wireless communication device, wherein the service-agnostic threshold defines an occurrence of a handover event with respect to a signal parameter, and wherein the indication causes the wireless communication device to monitor the signal parameter according to the service-agnostic threshold while the one or more applications are not being executed;

store a plurality of application-specific thresholds each re-defining the occurrence of the handover event with respect to the signal parameter by superseding the service-agnostic threshold and each corresponding to an application;

detect that a wireless communication device is executing a first application of the one or more applications;

select a first application-specific threshold from a subset of application-specific thresholds that correspond to the one or more applications being executed by the wireless communication device;

transmit, to the wireless communication device, an indication of the first application-specific threshold, wherein the indication causes the wireless communication device to monitor the signal parameter according to the first application-specific threshold;

detect that the wireless communication device is executing a second application of the one or more applications;

select a second application-specific threshold from the subset of application-specific thresholds that correspond to the one or more applications being executed by the wireless communication device; and transmit, to the wireless communication device, an indication of the second application-specific threshold to the wireless communication device, wherein the indication causes the wireless communication device to monitor the signal parameter according to the second application-specific threshold.

13. The at least one non-transitory computer-readable storage medium of claim 12, wherein execution of the one or more applications is detected based on a presence of one or more 5G radio bearers with the wireless communication device, the one or more 5G radio bearers corresponding to the one or more applications.

14. The at least one non-transitory computer-readable storage medium of claim 12, wherein the first application-specific threshold is selected based on being a strictest threshold within the subset of application-specific thresholds.

15. The at least one non-transitory computer-readable storage medium of claim 12, wherein the instructions cause the at least one non-transitory computer-readable storage medium to:

in response to detecting that at least one of the one or more applications is not being executed by the wireless communication device, transmit an indication to the wireless communication device to stop monitoring the handover event according to the first application-specific threshold.

16. The at least one non-transitory computer-readable storage medium of claim 12, wherein the indication of the first application-specific threshold is transmitted in a RRC reconfiguration message to the wireless communication device.

17. The at least one non-transitory computer-readable storage medium of claim 12, wherein the instructions further cause the at least one data processor to:

during a registration process of the wireless communication device, transmit a message to the wireless communication device that includes an indication of a set of handover events for the wireless communication device to monitor, wherein the indication includes one or more default thresholds for each handover event.

* * * * *